United States Patent [19]

Lanning

[11] 3,969,931
[45] July 20, 1976

[54] POWER TESTER FOR OUTBOARD DRIVE ASSEMBLIES

[76] Inventor: Charles T. Lanning, 303 NW. 10th St., Watertown, S. Dak. 57102

[22] Filed: Mar. 31, 1975

[21] Appl. No.: 563,516

[52] U.S. Cl. .............................. 73/117.1; 73/134
[51] Int. Cl.² ...................................... G01M 15/00
[58] Field of Search ................. 73/117, 134, 117.1, 73/118, 116

[56] References Cited
UNITED STATES PATENTS

| | | | |
|---|---|---|---|
| 2,106,493 | 1/1938 | Byers | 73/134 UX |
| 2,981,099 | 4/1961 | Lapp | 73/134 |
| 3,289,471 | 12/1966 | Maxwell | 73/117 |

*Primary Examiner*—Jerry W. Myracle
*Attorney, Agent, or Firm*—Clarence A. O'Brien; Harvey B. Jacobson

[57] ABSTRACT

A hydraulic pump is serially connected in a closed loop hydraulic circuit provided with a control valve for controlling the flow of hydraulic fluid through the circuit and the hydraulic motor has mounting structure operatively associated therewith for releasably supporting the hydraulic motor from the lower end gear housing of a marine drive assembly such as that used on outboard motors and inboard/outboard drive assemblies. The fluid motor includes a rotary power input shaft and is supported by the support structure with its input shaft axially aligned with the rear end of the propeller shaft of the lower end gear housing. Coupling structure is utilized to releasably drivingly couple the propeller shaft to the rotary input shaft of the hydraulic motor and the latter, in conjunction with the control valve equipped closed loop fluid circuit, may be used to apply an adjustable load on the marine drive assembly propeller shaft and in this manner the associated outboard motor for inboard/outboard drive system may be operated at any throttle setting and operating speed in order to simulate actual on water operating conditions, the hydraulic motor and associated marine drive unit being receivable within a conventional test tank or a flushing unit attachment being utilized in conjunction with the marine drive assembly in order to provide sufficient cooling water for the motor of the marine drive assembly.

14 Claims, 7 Drawing Figures

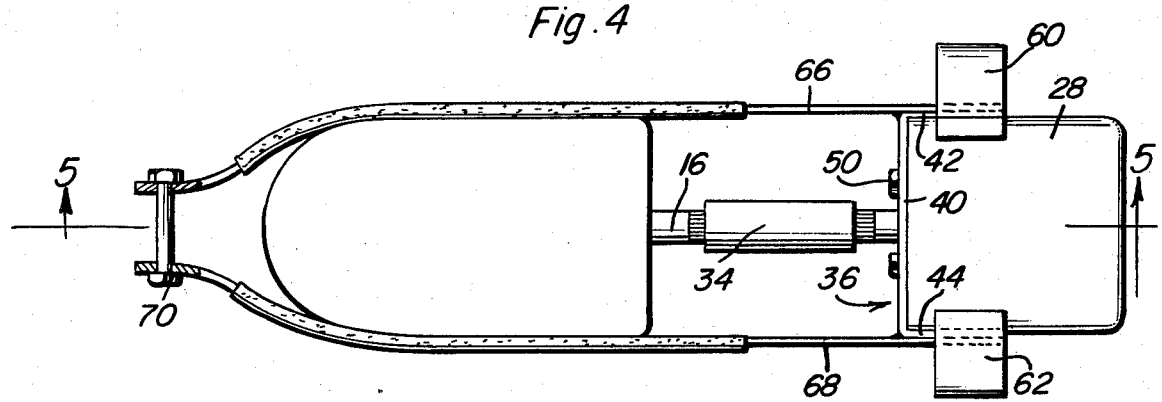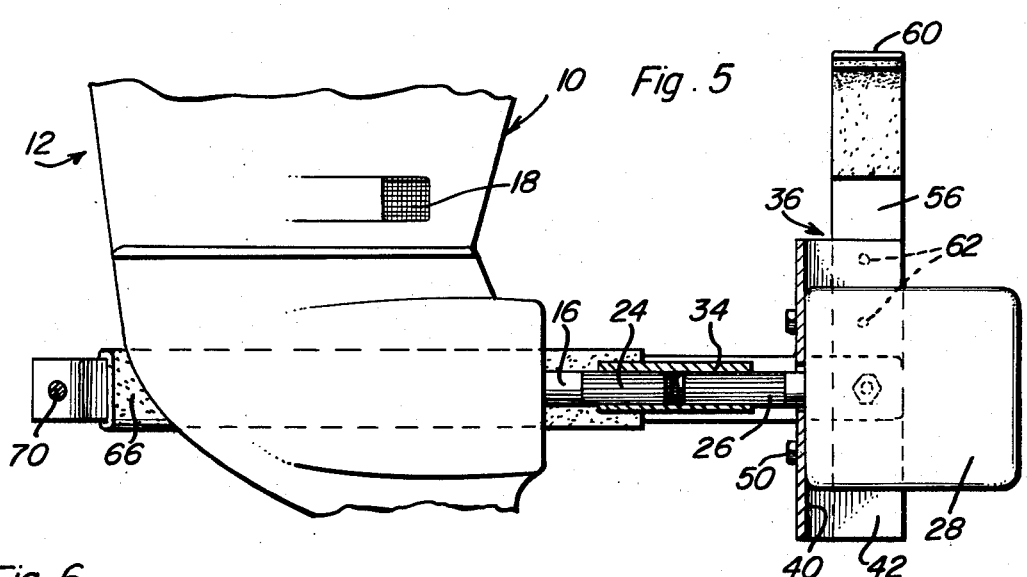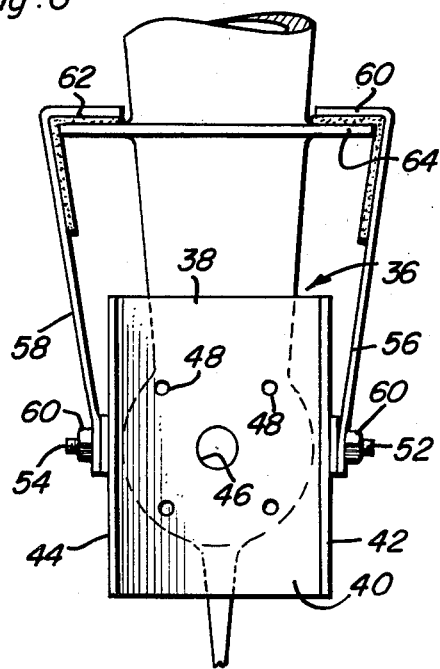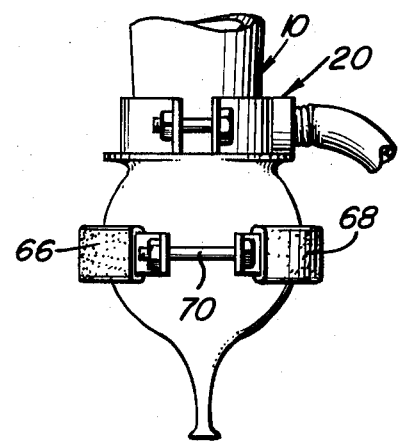

3,969,931

POWER TESTER FOR OUTBOARD DRIVE ASSEMBLIES

BACKGROUND OF THE INVENTION

Various forms of dynamometers and other structures for applying variable loads to engine drive assemblies have been heretofore designed. In addition, some of these previously known assemblies have been specifically designed for use in conjunction with outboard motors and inboard/outboard drive assemblies for simulating over the water operation to enable outboard motors and inboard/outboard drive assemblies to be tested without actually operating the associated boat on the surface of the body of water.

Examples of previously patented assemblies or structures of this type are disclosed in U.S. Pat. Nos. 2,218,463, 2,669,870, 2,831,345, 2,982,128, 2,993,369, 3,505,863 and 3,592,053.

SUMMARY OF THE INVENTION

The power tester of the instant invention is in the form of a hydraulic motor supported from the lower unit of an outboard motor or inboard/outboard drive assembly with the propeller shaft (after the propeller has been removed therefrom) drivingly coupled to the rotary input shaft of the hydraulic motor. Bracing is provided for stationarily supporting the motor from the associated lower unit and the hydraulic motor is serially connected in a closed loop hydraulic circuit equipped with a throttle valve whereby variable loads may be placed upon the propeller shaft of the unit for testing purposes.

The main object of this invention is to provide a variable load developing unit for the propeller shaft of an outboard motor or inboard/outboard drive assembly.

Another object of this invention is to provide an apparatus whereby a variable load under varying operating speed conditions may be placed upon an associated propeller shaft.

Still another object of this invention is to provide a power tester in accordance with the preceding objects and which may be submerged within a test tank or utilized in conjunction with a conventional flushing attachment for an outdrive assembly.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a top plan view of the lower unit mounted portion of the power tester in operative association with the propeller shaft of an associated lower unit;

FIG. 5 is a fragmentary vertical sectional view taken substantially upon the plane indicated by the section line 5—5 of FIG. 4;

FIG. 6 is a rear elevational view of the assemblage illustrated in FIGS. 4 and 5 and with the hydraulic motor removed; and FIG. 7 is a front elevational view of the assemblage illustrated in FIG. 1.

DETAILED DESCRIPTION OF THE INVENTION

Referring now more specifically to the drawings, the numeral 10 generally designates the upstanding power leg of a conventional outboard motor including a lower unit 12 provided with a front-to-rear extending horizontally elongated gear housing 14 from whose rear end a propeller shaft 16 extends (the marine propeller usually mounted thereon having been removed therefrom).

Figure 1:
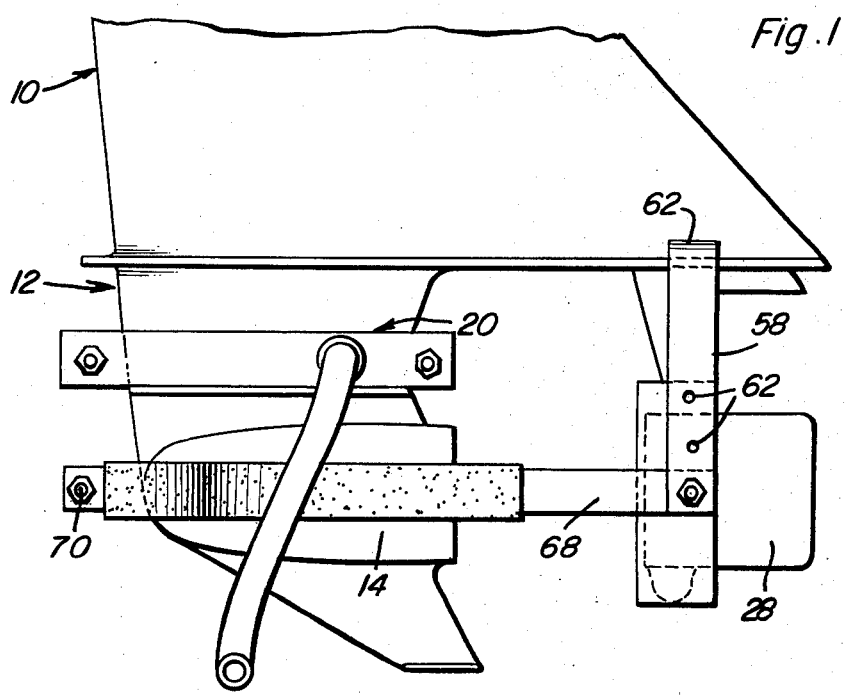
FIG. 1 is a side elevational view of the lower unit of an outboard motor with the power tester of the instant invention operatively associated therewith.

From FIG. 5 of the drawings it may be seen that the lower unit 12 includes a side water intake 18 and from FIG. 1 of the drawings it may be seen that the lower unit 12 may have a conventional flushing attachment referred to in general by the reference numeral 20 operably clamped thereabout over the intake 18 in order to supply sufficient cooling water to the outboard motor 10.

The propeller shaft 16 is splined as at 24 and the splined rotary input shaft 26 of a hydraulic motor 28 including an outlet 30 and an inlet 32 is coupled to the propeller shaft 16 by means of a sleeve coupling 34 which is internally splined.

A mounting assembly referred to in general by the reference numeral 36 is provided and includes a main channel-shaped plate 38 consisting of an upstanding bight portion 40 and a pair of upstanding rearwardly directed opposite side flanges 42 and 44. The bight portion 40 has a central bore 46 formed therethrough and a plurality of smaller bores 48 spaced thereabout. The rotary input shaft 26 of the hydraulic pump 28 extends through the central bore 46 and the forward end of the hydraulic motor 28 is supported from the bight portion 40 by means of fasteners 50 secured through the bores 48 and threadedly engaged in the motor 28.

The opposite side flanges 42 and 44 include oppositely outwardly projecting threaded studs 52 and 54 to which the lower ends of a pair of upstanding arms 56 and 58 are secured by means of fasteners 60 threadedly engaged with the studs 52 and 54. The arms 56 and 58 include a plurality of bores 62 formed therein at points spaced therealong through which the studs 52 and 54 are receivable. Accordingly, the effective height of the arms 56 and 58 relative to the channel member 38 may be adjusted. The upper ends of the arms 56 and 58 include padded inwardly directed flanges 60 and 62 which lap over opposite side portions of a horizontally outstanding peripheral cavitation plate 64 carried by the lower unit 12.

In addition to the arms 56 and 58, the rear ends of a pair of front-to-rear extending clamp arms 66 and 68 are also secured over the studs 52 by means of the fasteners 60. The forward ends of the arms 66 and 68 curve toward each other in front of the forward end of the gear housing 14 and are clamped together by means of a clamping bolt 70. In this manner, the hydraulic motor 28 is securely removably supported from the lower unit 12.

Figure 3:
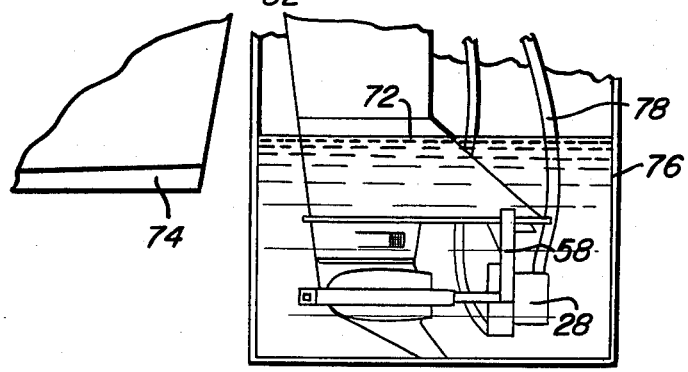
FIG. 3 is a fragmentary side elevational view of the power tester in operative association with the lower unit of an inboard/outboard drive assembly disposed within a test tank.

With attention now invited more specifically to FIG. 3 of the drawings, it may be seen that the hydraulic motor 28 may also be supported in operative association from the lower unit 72 of an inboard/outboard drive assembly supported from a boat hull 74. If it is desired, the hydraulic motor 28 and the lower unit of the assembly 72 may be submerged within a conventional test tank 76. In this case, it is not necessary to utilize a flushing attachment such as the attachment 20 in conjunction with the lower unit 72.

Figure 2:
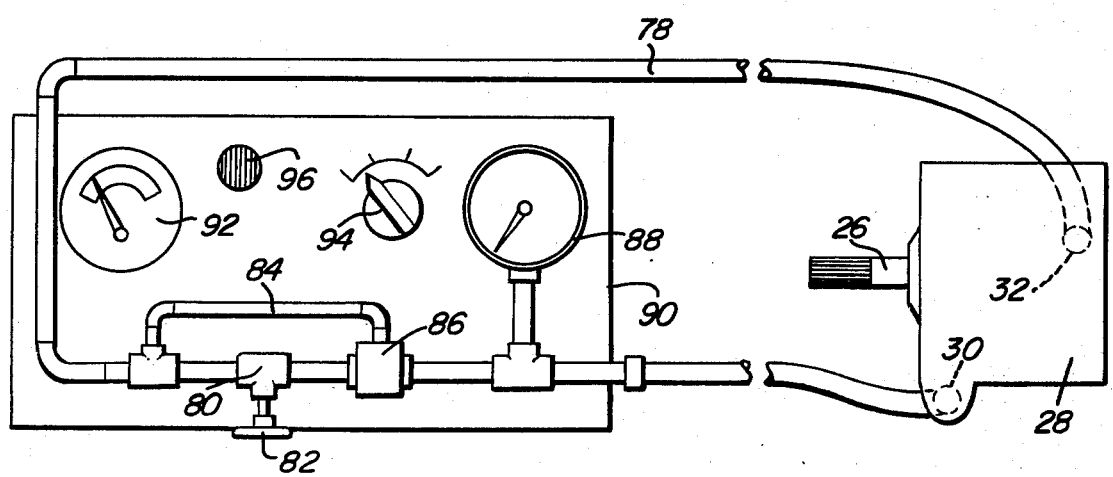
FIG. 2 is a fragmentary elevational view of the hydraulic circuitry of the power tester including the hydraulic motor thereof, portions of the hydraulic circuit being broken away.

With attention now invited more specifically to FIG. 2 of the drawings, it may be seen that the outlet 30 and inlet 32 of the pump 28 are serially connected in a closed loop hydraulic circuit 78 and that the circuit 78 includes a throttle valve 80 serially connected therein and provided with an adjustment operator 82. In addition, the circuit 78 includes a bypass line 84 which bypasses the throttle or control valve 80 and the inlet end of the bypass line 84 has a pressure relief valve 86 operatively associated therewith. Further, a pressure gauge 88 is communicated with the circuit 78 intermediate the pump outlet 30 and the pressure relief valve 86.

The components 80, 82, 84, 86 and 88 may be supported from a suitable cabinet 90 which also supports a tachometer 92 and tachometer selector switch 94 for adapting the tachometer 92 to be utilized in conjunction with marine engines having different numbers of cylinders. Still further, the cabinet 90 may include a heat indicator 96 for operative association with the power head of the marine drive unit being tested.

In operation, the hydraulic pump 28 is mounted in operative association with the propeller shaft of the marine drive assembly to be tested and suitable means such as the flushing attachment 20 or test tank 76 may be utilized to ensure that the power head of the marine drive unit will be supplied with sufficient amounts of cooling water. Then, the marine drive unit may be operated and varying loads may be placed upon the propeller shaft thereof by the control valve 80. The operating speed of the marine drive unit may be monitored by the tachometer 92 and the operation of the power head portion of the associated marine drive unit may be carefully monitored by various testing equipment (not shown) while the marine drive unit is operating under a load as a result of the variable throttling of the closed loop hydraulic circuit 78.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a marine drive assembly of the type including an upstanding power leg having a lower end gear housing extending in a front-to-rear direction and including a rotary propeller shaft projecting rearwardly outwardly from said housing adapted to have a marine propeller mounted thereon, said power leg also including a laterally outwardly projecting peripheral cavitation plate spaced above the gear housing and propeller shaft, a fluid pressure pump including a rotary input shaft, a fluid inlet and a fluid outlet means, means drivingly coupling said propeller shaft to said input shaft, control valve means operatively associated with said outlet means for variably controlling the flow of fluid from said pump through said outlet means, and mounting means connected to said pump and releasably supported from said power leg stationarily supporting said pump from said power leg.

2. The combination of claim 1 wherein said input shaft is aligned with said propeller shaft, said means drivingly coupling said propeller shaft to said input shaft.

3. The combination of claim 1 wherein said fluid input and outlet means comprise sections of a closed loop fluid circuit in which said fluid motor is serially connected.

4. The combination of claim 1 including fluid pressure sensing and indicating means operatively connected with said fluid outlet means upstream from said valve means.

5. The combination of claim 1 including a relief pressure controlled fluid bypass line connected in parallel to said fluid output means bypassing said control valve means.

6. The combination of claim 1 wherein said pump is spaced below said cavitation plate and includes opposite side portions, said mounting means including a first portion supported from said pump and a pair of opposite side upwardly projecting arms supported from said first portion at their lower ends and removably engaged with opposite side portions of said cavitation plate.

7. The combination of claim 6 wherein said mounting means also includes a pair of opposite side horizontal arms attached at their rear ends to said first portion, the forward ends of said horizontal arms being clamped about opposite side portions of said gear housing.

8. The combination of claim 6 wherein said first portion and the lower ends of said upwardly projecting arms include coacting means operative to adjust the effective length of said upwardly projecting arms.

9. The combination of claim 8 wherein said mounting means also includes a pair of opposite side horizontal arms attached at their rear ends to said first portion, the forward ends of said horizontal arms being clamped about opposite side portions of said gear housing.

10. The combination of claim 9 wherein said input shaft is aligned with said propeller shaft, said means drivingly coupling said propeller shaft to said input shaft.

11. The combination of claim 10 wherein said fluid input and outlet means comprise sections of a closed loop fluid circuit in which said fluid motor is serially connected.

12. The combination of claim 11 including fluid pressure sensing and indicating means operatively connected with said fluid outlet means upstream from said valve means.

13. The combination of claim 12 including a relief pressure controlled fluid bypass line connected in parallel to said fluid output means bypassing said control valve means.

14. The combination of claim 1 wherein said pump is disposed rearward of said propeller shaft and said input shaft is aligned with said propeller shaft, said mounting means including first and second portions connected between said pump and said gear housing and between said pump and said cavitation plate, respectively.

* * * * *